US008737691B2

(12) United States Patent
Sivaraman et al.

(10) Patent No.: US 8,737,691 B2
(45) Date of Patent: May 27, 2014

(54) METHODS AND SYSTEMS FOR CREATING VIRTUAL TRIPS FROM SETS OF USER CONTENT ITEMS

(75) Inventors: Sundar Sivaraman, Tamil Nadu (IN); NarayanaDhoss Gopalakrishnan, Tamil Nadu (IN); Maria M. Sagayaraj, Tamil Nadu (IN); Ganesh Ramasamy, Tamil Nadu (IN); Rajeswaran Venugopal, Tamil Nadu (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 133 days.

(21) Appl. No.: 13/542,500

(22) Filed: Jul. 5, 2012

(65) Prior Publication Data

US 2014/0010405 A1 Jan. 9, 2014

(51) Int. Cl.
*G06K 9/00* (2006.01)

(52) U.S. Cl.
USPC ........ 382/104; 707/752; 455/456.1; 701/438; 725/61; 715/716

(58) Field of Classification Search
USPC ........... 382/100, 103, 104.232; 715/715, 850, 715/760, 782, 700, 757, 716, 756; 725/61, 725/97; 379/201.04, 207.12, 201.09, 201.1; 701/400–410, 418, 420, 436, 438, 439, 701/446, 450, 461; 345/419, 428; 702/5; 455/457; 707/705–770
See application file for complete search history.

(56) References Cited

U.S. PATENT DOCUMENTS

| 4,963,865 | A  | * | 10/1990 | Ichikawa et al. | 340/995.14 |
| 5,931,888 | A  | * | 8/1999  | Hiyokawa | 701/428 |
| 6,034,626 | A  | * | 3/2000  | Maekawa et al. | 340/995.21 |
| 6,243,076 | B1 | * | 6/2001  | Hatfield | 345/156 |
| 6,718,263 | B1 | * | 4/2004  | Glass et al. | 701/522 |
| 6,898,516 | B2 | * | 5/2005  | Pechatnikov et al. | 701/411 |
| 6,950,535 | B2 | * | 9/2005  | Sibayama et al. | 382/113 |
| 7,933,395 | B1 | * | 4/2011  | Bailly et al. | 379/201.04 |
| 8,302,007 | B2 | * | 10/2012 | Barcay et al. | 715/715 |
| 2005/0216186 | A1 | * | 9/2005 | Dorfman et al. | 701/207 |
| 2010/0042923 | A1 | * | 2/2010 | Barcay et al. | 715/715 |
| 2011/0078714 | A1 |   | 3/2011 | Sagayaraj et al. |  |
| 2012/0084000 | A1 | * | 4/2012 | Wang et al. | 701/426 |
| 2013/0051623 | A1 | * | 2/2013 | Ofek et al. | 382/103 |

OTHER PUBLICATIONS

"Automatically use location data to map—Picasa and Picasa Web Albums Help," retrieved Mar. 29, 2012. <http://support.google.com/picasa/bin/answer.py?hl=en&answer=70731>Screen shots from Picasaweb.Google.com taken in Mar. 2012.

* cited by examiner

*Primary Examiner* — Anand Bhatnagar

(57) ABSTRACT

A set of user content items, such as a set of photographs or audio or video recordings, is used to identify recommended locations. Each item of user content in the set includes a geographical identifier and a time-stamp indicative of the location and time of origin of the item. The items of user content are placed in time-order, and a route is determined that links, in time-order, the locations identified by the geographical identifiers. A recommended location is then identified, from a database of recommended locations, that is located near the determined route but is not geographically coincident with the locations of any of the items of user content. Information for a map containing the route and an illustration of the identified location are sent to a terminal device for presentation to a user.

16 Claims, 6 Drawing Sheets

FIG. 3A  300

| User Content Database ||||| 
|---|---|---|---|---|
| SetID | Multimedia Content | Location | Time | UserID |
| A1F | DSC001.jpg | 34°56'08"N 56°07'57"W | 06/08/12 12:23:36 pm | 1 |
| A1F | DSC002.wav | 35°00'36"N 56°08'12"W | 06/08/12 2:31:02 pm | 1 |
| A1F | DSC432.mov | 34°24'48"N 55°42'37"W | 06/09/12 9:23:12 am | 1 |
| 3EC | RdTrip'12_4.jpg | 41°40'36"S 85°59'26"E | 07/12/12 11:23:12 am | 1 |
| ... | ... | ... | ... | ... |

FIG. 3B  330

| Recommended Location Database |||||
|---|---|---|---|---|
| ItemID | Multimedia Content | Location | Name | Attributes |
| 1 | //RecLocDB/ MMC/Picture.jpg | 44°27'35"N 110°49'57"W | Old faithful | National park; tourist site; hiking; car only |
| 2 | //RecLocDB/ MMC/Audio.wav | 41°40'36"N 85°59'26"W | Tony's Italian Restaurant | Restaurant; Italian; $$$; car bike foot |
| ... | ... | ... | ... | ... |

FIG. 3C  360

| User Preference Data |||||
|---|---|---|---|---|
| UserID | User Content SetID(s) | Trip length | Locations Visited | Interests |
| 1 | SetID=A1F; SetID=3EC | 3-5 days | Arizona; District of Columbia; Mexico | National park; nature; hiking; car bike; $ |
| 2 | SetID=A45 | 1-3 weeks | Paris; France; Chicago | Tourist site; city; plane foot; $$$ |
| ... | ... | ... | ... | ... |

METHODS AND SYSTEMS FOR CREATING VIRTUAL TRIPS FROM SETS OF USER CONTENT ITEMS

BACKGROUND

In recent years, digital cameras and recorders have increased in popularity, and have enabled users of cameras and recorders to generate large numbers of digital photographs and audio or video recordings. When returning from a trip or vacation, a user generally has a set of photographs and recordings relating to the trip. The photographs and recordings can be presented as a slideshow to the user, to the user's friends, family, or colleagues, and/or to other unrelated users.

The slideshow, however, must be manually created. In addition, the slideshow is limited to the user's photographs and recordings, and generally does not include additional content. A need therefore exists for systems and methods for automatically creating a virtual trip based on a user's photographs and recordings, and including additional content such as personalized maps showing the user's trip and recommendations of locations to visit or of third-parties' photographs to include (such as photographs of popular locations on the trip that the user failed to visit, and/or that the user failed to photograph).

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3A shows a data structure for storing user content information in a user content database.

FIG. 3B shows a data structure for storing recommended location information in a recommended locations database.

FIG. 3C shows a data structure for storing user preference information in an application data database.

DETAILED DESCRIPTION

Figure 1:
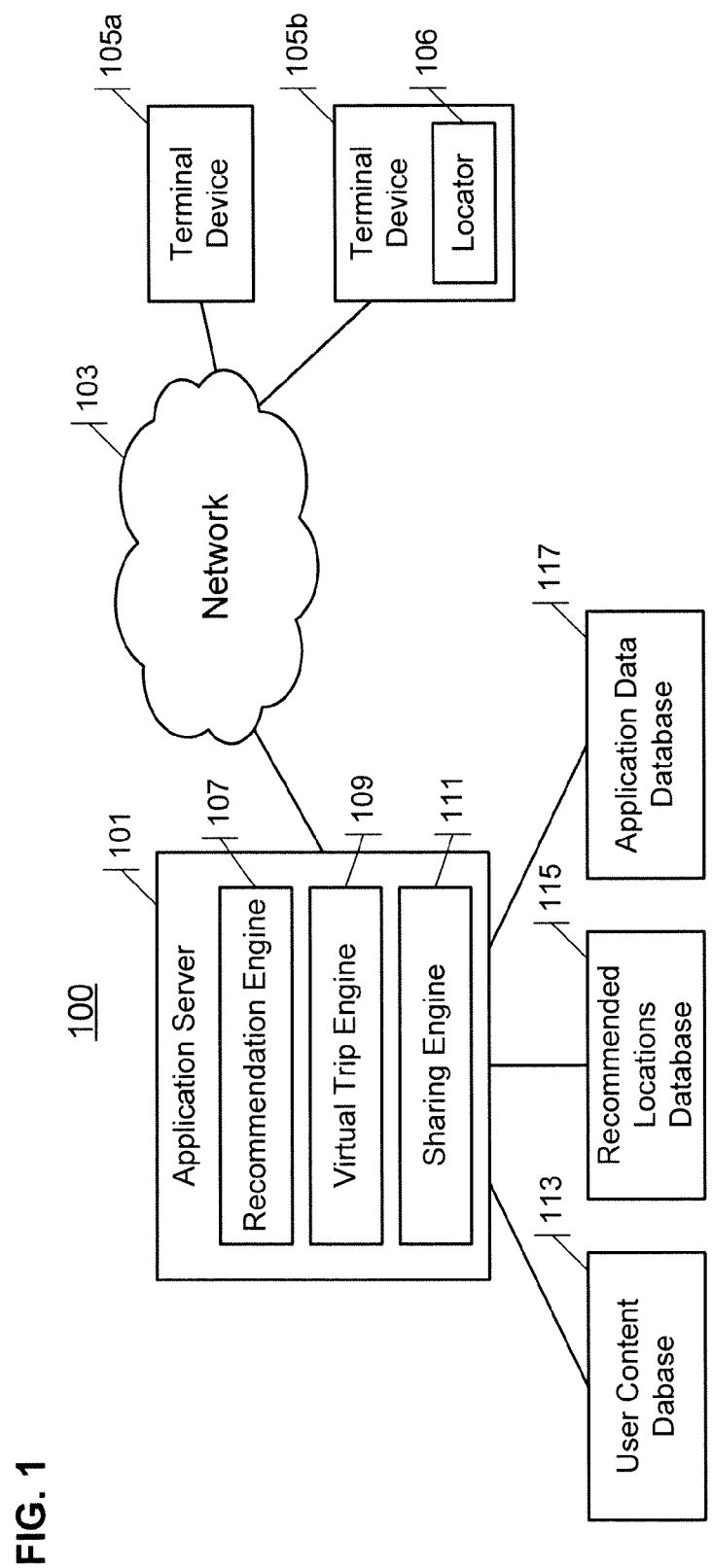
FIG. 1 is a high-level functional block diagram of a system for providing services relating to virtual trips.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to identifying a recommended locations based on a set of items of user content, such as a set of multimedia items such as images (e.g., photographs), audio, or video recordings including location information. The systems and methods further relate to generating multimedia presentations including the items of user content, the identified locations, and maps showing locations associated with the items of user content and the identified locations.

A recommendation engine can thus be used to provide, based on a set of user photographs, recordings, or other user content items, recommendations of locations that are related to the items in the set. In one example, the items of user content correspond to photographs taken during a trip. The recommended locations may be locations located near, but not coincident with, the locations of the photographs. The user may thus receive recommendations of locations which the user failed to photograph or failed to visit during the trip. The recommended locations can be used to include, in a photo album related to the trip, photographs of or advertisements related to the missed locations. Alternatively, the recommended locations can be used to recommend, to other users viewing the photo album, locations which the users may visit should they choose to go on a similar trip.

A virtual trip engine uses the user content and the recommended locations to automatically generate a multimedia presentation (e.g., a slideshow or movie) including the content. The multimedia presentation can be referred to as a virtual trip (VT), and includes the images, sounds, videos, and/or other multimedia items included in the user content. The VT can further include the recommended location(s) and/or associated multimedia item(s), and a map showing the locations associated with the items of user content and the recommended locations.

In addition, a sharing engine enables a user to share a set of user content or a virtual trip with one or more target users. As part of sharing the content, the sharing engine can automatically activate the recommendation engine to identify recommended locations which may be of particular interest to a target user, based on user preference information for the target user. The sharing engine can then automatically activate the virtual trip engine to generate a VT for the target user including the recommended locations identified based on the target user's preference information.

FIG. 1 is a high-level functional block diagram of a system 100 for providing services relating to virtual trips. The system 100 includes an application server 101 in communication through a network 103 with one or more terminal devices 105a, 105b (referenced generally as terminal device(s) 105). The network 103 may be a single network that the application server 101 and the terminal devices 105 are configured to connect to and communicate through, or the network 103 can correspond to an interconnection of two or more networks used to communicatively couple the application server 101 and terminal devices 105 using one or more inter-network gateways. The network(s) 103 may be wired or wireless. In various examples, the network 103 includes one or more of mobile communication network(s) (e.g., GSM, CDMA, 3GPP, SS7, . . . ), private or public network(s) (e.g., LAN, WAN, or Ethernet), and packet-based network(s) (e.g., an IP-based network such as the Internet). The application server 101 includes a recommendation engine 107 for providing location recommendations, a virtual trip engine 109 for automatically generating virtual trips, and a sharing engine 111 for sharing virtual trips with other users. The application server 101 is in communication with one or more databases storing data for use by the engines 107-111, including a user content database 113, a recommended locations database 115, and an application data database 117.

The terminal devices 105 may be mobile stations configured for generation of multimedia items and for communication on a mobile communication network and/or packet-based networks (e.g., WIFI networks) such as mobile telephones or smartphones, tablets or computer terminals configured for communication in wired or wireless networks (e.g., mobile or WIFI networks). The terminal devices 105 can also be digital cameras, recorders, or camcorders configured for wired or wireless communication with a computer terminal or directly with a network, or other similarly equipped devices. At least some terminal devices 105 include a location determination unit (e.g., locator 106) configured to determine a location of the terminal device. The locator 106 can be used to provide a location of origin for a multimedia item by determining the location of the terminal device 105 at the time the multimedia item is captured, created, or otherwise originated at the terminal devices 105. The locator 106 can be a global positioning system (GPS) receiver, a system to triangulate a location based on received signals (e.g., based on received mobile communication signals), or any other device for determining a location of a corresponding terminal device 105. In one example, the terminal device 105 is a GPS-enabled camera that associates a GPS location and timestamp with any photograph or video captured by the device. In the example, the terminal device 105 may connect to network 103 to upload all captured photographs and videos to an online storage device, such as user content database 113.

The user content database 113 stores one or more sets of user content. A set of user content may be a set of multimedia items such as photographs (images), audio or video recordings, or the like, that a user has captured, generated, or assembled. The set of user content may, for example, correspond to a set of photographs and audio and video recordings that the user captured using a digital camera, recorder, camcorder, or other capture device during a trip, outing, or recording session. Each item of user content in the database 113 includes a multimedia item (i.e., the image, audio, or video) and associated metadata including a geographical identifier and a time-stamp indicating the location and time of origin of the respective item of user content. The metadata may be automatically recorded with the multimedia item by the recording device (e.g., by a GPS-enabled recording device), or manually recorded with the multimedia item by the user. The geographical identifier can be a set of GPS coordinates, a location identifier used to triangulate a location based on received signals from surrounding WIFI or mobile communication networks, or another location identifier such as an address or place name (e.g., "the White House", or "1600 Pennsylvania Ave. NW, Washington D.C.").

The recommended locations database 115 stores information on recommended locations. Each recommended location in the database 115 includes a geographical identifier indicating the geographical location associated with the recommend location. Each recommended location can further include a multimedia item (e.g., photograph, image, audio or video recording, or the like) representative of or otherwise associated with the location. Recommended locations can also include information relating to the location, including a location name and metadata associated with the location and identifying attributes of the location. Attributes of the location can include the type of location (e.g., tourist or historic site, park, restaurant or other commerce, etc.) and any additional known attributes of the location (e.g., types of cuisine and/or price in the case of a restaurant; etc.). The attribute metadata can be used to identify locations which may be of interest to a particular user based on user preference information. In one example, a recommended location may include the White House, and include a geographical identifier (e.g., GPS coordinates, street address, or the like), a photograph, and attributes indicating that it is a tourist site and that it is accessible by car, foot, and public transit.

The application data database 117 stores data, other than user content and recommendation location data, for use by the application server 101. The application data database 117 can thus store program instructions for execution by a processor of the application server 101, of the recommendation engine 107, of the virtual trip engine 109, and/or of the sharing engine 111 in order to provide the application services provided by the server and/or engines. The application data database 117 can also store other data used in executing applications or engines on the server 101. In one example, the application data database 117 stores user preference information provided by users and/or generated by the application server and used by the application server or engines during operation.

The application server 101 is shown as a standalone server that is communicatively coupled to each of the databases 113, 115, and 117, and to the network 103 through direct communication links. More generally, the application server 101 may be distributed across a plurality of application servers, such as individual servers performing the functions of each one of the engines 107, 109, and 111. The application server 101 may be directly or indirectly coupled to the databases 113, 115, and 117, to network 103, and/or to terminal devices 105 through one or more networks or dedicated connections. In one example, one or more of the databases 113, 115, and 117 may be stored on the application server 101.

Each engine 107, 109, and 111 of the application server 101 can include hardware and/or software components configured to provide the functionality of the engine as described herein. In one example, the engines 107, 109, and 111 are software application programs that are retrieved for execution on one or more processors of the application server 101 from a local memory of the server 101, from the application data database 117, or through network 103 from a remote storage or device.

The functioning of each of the recommendation, virtual trip, and sharing engines 107, 109, and 111 will be described in more detail with reference to the following FIGS. 2A-2D.

Figure 2A:
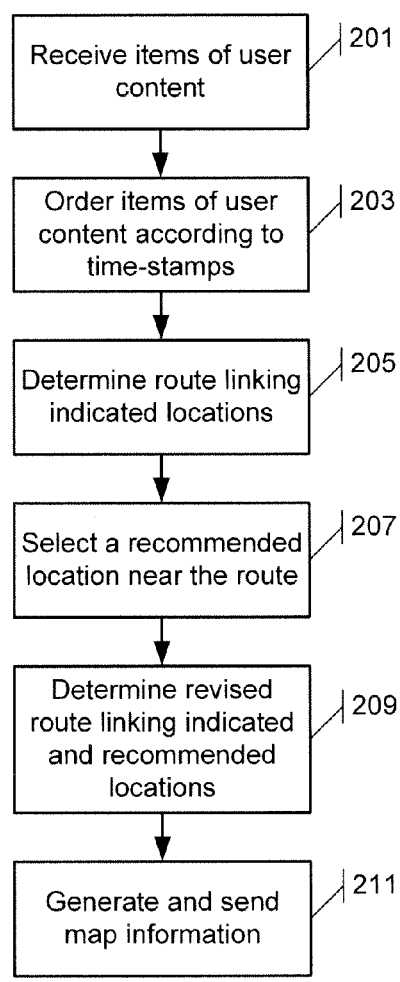
FIG. 2A is a flow diagram showing steps involved in a method for identifying a recommended location based on a set of user content.

FIG. 2A is a flow diagram showing steps involved in a method 200 for identifying a recommended location based on a set of user content. In the system 100 of FIG. 1, the method 200 may be performed at least in part by the recommendation engine 107 of application server 101.

The method 200 begins at step 201 with the application server 101 receiving a set of items of user content. In general, the set of items of user content is received from the user content database 113, where the items of user content are stored in association with each other as a set. In some examples, the items of user content may have previously been retrieved from a terminal device 105 or other recording device, and stored in the user content database 113 in association with each other as part of the set. In general, terminal devices 105 can be associated with particular users, and items of user content captured, created, or otherwise originated on a particular terminal device 105 can be automatically associated with the user associated with the device. Alternatively, user accounts on terminal devices 105 can be associated with users, and items of user content captured when the terminal device 105 operates in a user account can be automatically associated with the user of the account. Furthermore, a user can manually identify items of user content that should be associated with each other as part of a set (e.g., by selecting the items of user content, and selecting on option to associated them as a set), or items of user content uploaded from the terminal device 105 to the user content database 113 as part of a particular upload operation may be automatically associated with each other as part of a set. Each retrieved item of user content includes one or more multimedia item(s) and associated metadata including a geographical identifier and a time-stamp indicating location and time of origin of the respective item of user content.

In step 203, the time-stamp information stored in the metadata of each item of user content in the set is retrieved. The items of user content in the set are ordered in time-order, based on the time-stamp information. In general, the items of user-content are ordered in ascending chronological order from oldest to newest.

In step 205, the geographical identifier information stored in the metadata of each item of user content in the set is retrieved. A route is determined that links, in time-order, the locations indicated by the geographical identifiers included in the metadata for the items of user content. In particular, the route links the locations such that the route begins at the location associated with the first item of content of the ordered set, traverses in order each of the locations associated with the time-ordered items of content, and ends at the location associated with the last item of content of the ordered set. In some examples, the route can include additional locations, such as trip-start and trip-finish locations identified by a user and indicative of locations at which the route should begin and end, respectively. Optionally, a user may also designate additional locations (e.g., those that are near one or more of the identified locations along the trip) that should be included in the route.

In some examples, the route linking the locations is a series of straight-line paths linking pairs of locations in time-order. In other examples, the route linking the locations is a series of paths following known routes between pairs of locations, such as a route that follows known roadways, bike paths, hiking trails, walking paths, and/or sidewalks to link two locations. In the other examples, the route may be selected to minimize distance travelled (while remaining on known paths), to minimize travel time (e.g., by using speed-limit or recommended speed information for each known path segment), to use certain types of paths (e.g., a route that remains on roadways only), or to satisfy other criteria. In addition to determining the route, a mode of transport for traversing the route may be identified based on user input (e.g., based on a user selection of a type of transport), or based on characteristics of the route indicating that the route is best travelled by plane, car, bicycle, or by foot. The characteristics used to identify a mode of transport may include speed of travel (e.g., determined based on the ratio of the distance between two locations/items to the period of time between time-stamps associated with the locations/items), distance of travel (e.g., total route length), or the like. High speeds (e.g., above 50 kph) and large distances (e.g., above 80 km) may be associated with car travel, while lower speeds and distances may be associated with foot and/or bike travel.

Once the route linking the time-ordered locations is determined, one or more recommended locations are selected near the determined route in step 207. The recommended locations are selected from the recommended locations database 115, based on the geographical identifier of each recommended location and on the determined route. In general, the selection identifies locations that are located near the determined route, but that are not geographically coincident with any of the locations indicated by the geographical identifiers of the items of user content. Locations can be identified as being located near a route if the locations are located within a first particular distance from the route (e.g., a 50 kilometer radius). Locations can further be identified as not being coincident with any of the locations indicated by the geographical identifiers if the locations are spaced away from the locations by at least a second particular distance (e.g., a 300 meter radius).

The recommended locations can also be selected based on a transportation mode associated with the route. In particular, the first and second distances may be adjustably selected based on the transportation mode associated with a route. In one example, the first distance is set to a 300 meter radius from the route in the case of a route best travelled by foot or to a 50 km radius in the case of a route best travelled by car. In another example, the second distance is set to a distance of at least 100 m from a location in the case of a route best travelled by foot or to a distance of at least 1 km from a location in the case of a route best travelled by car, such that the recommendation engine does not recommend locations previously visited and photographed by the user.

The first and second distances may further be adjustably selected based on other criteria. In one example, the first distance is adjusted based on a trip length. In the example, the first distance may be set to a 80 km radius in the case of a route best travelled by car for a "long" trip length (e.g., a trip having a route exceeding 800 km, or having been completed in more than two days or 48 hours). However, the first distance may be set to a distance of 80 km in the case of a route corresponding to a "medium" or "weekend" trip (e.g., a trip having a route length between 300 km and 799 km, or having been completed in 24 hours to 48 hours). Finally, the first distance may be set to a distance of 20 km in the case of a route corresponding to a "short" or "day" trip (e.g., a trip having a route length less than 299 km, or having been completed in less than 24 hours). In another example, the first distance is adjusted based on an attribute of a recommended location. The first distance can thus be selectively adjusted based on the attributes of the location, for instance to increase the first distance in the case of a location having a long visit time (e.g., in the case of a location indicated as being a museum or national historic site, and which a user may be willing to make a larger detour for) or to decrease the first distance in the case of a location having a short visit time (e.g., in the case of a scenic viewpoint, and which a user may not be willing to make a large detour for).

In step 209, a revised route is determined which links the time-ordered locations of the items of user content and the location(s) selected in step 207. As part of determining the revised route, the selected location(s) are put in order with the items of user content. In particular, in different embodiments the selected location(s) are placed within the sequence of time-ordered locations for the items of user content such that the revised route is the shortest (geographically or temporally) route linking the locations for the items of user content (in time order) and additionally passing through the selected location. As in the case of step 205, the ordering of the selected location(s) with the items of user content, and the selection of the revised route, can be performed so as to minimize travel time, minimize travel distance, or satisfy other routing criteria.

Finally, in step 211, the original route information (i.e., information relating to the route of step 205) and/or the revised route information is sent to the virtual trip engine 109, such that the virtual trip engine 109 can create a map containing an illustration of the original and/or revised route, and include the created map as an illustration in a VT. In addition, the virtual trip engine 109 can create a VT including the multimedia items associated with the items in the set of user content, the multimedia items associated with the recommended locations (including, for example, an illustration of the recommended location), and the created map. Once created, the VT can be viewed on a display screen of a terminal device 105.

Figure 2B:
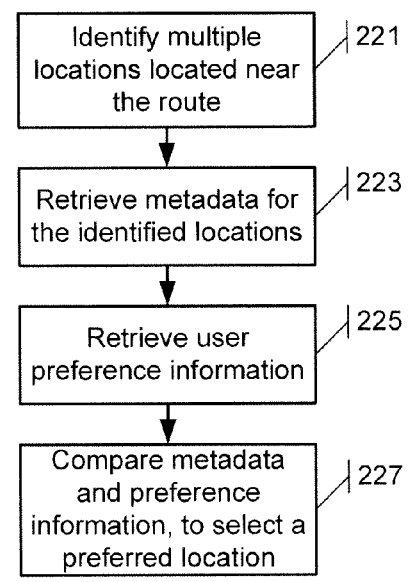
FIG. 2B is a flow diagram showing steps involved in a method for selecting recommended locations based on user preference information.

FIG. 2B is a flow diagram showing steps involved in a method 220 for selecting recommended locations based on user preference information. In the system 100 of FIG. 1, the method 220 may be performed at least in part by the recommendation engine 107 of application server 101. In the method 200 of FIG. 2, the method 220 may be performed as part of step 207.

The method 220 can thus be used to identity locations that are not only located near a route, but that may also be of interest to a user based on user preference data. The user preference data may form part of a user profile storing information provided directly by a user (e.g., information provided in response to a series of prompts for creating the user profile), or storing user preference information automatically generated based on sets of items of user content that are associated with the user, and/or based on other user data. In one embodiment only those locations both near the route and identified to be of interest to the user may be provided. In other embodiments, locations near the route, but are not necessarily identified to be of interest to the user, may be provided may be provided as well.

In step 221, multiple locations are identified that are located near the determined route of step 205, but that are not geographically coincident with any of the locations indicated by the geographical identifiers of the items of user content. The multiple locations may be identified as described in relation to step 207 above.

In step 223, metadata for each of the identified locations is retrieved. The metadata can include identifying attributes of the locations, such as attributes identifying the type of location (e.g., tourist or historic site, park, restaurant or other commerce, etc.) and any additional known attributes of the location (e.g., types of cuisine and/or price in the case of a restaurant; etc.).

In step 225, user profile information for a user is retrieved, the user profile information including metadata indicative of user preferences. The profile information may be that of a user associated with the items of user content, of a user identified as a sharing target for the items of user content, or of any other appropriate user. The profile information can include information about a user's travels and interests, such as preference information relating to a length of trip, type of trip, type of hotel, type of destination, type of transport, interests, activities, etc.

In step 227, the metadata associated with each identified location is compared with the metadata indicative of the user preference, and one or more locations among the identified locations are selected based on the comparison. In one example, the identified locations may each be given a preference ranking based on the number of attributes of metadata of the identified location that match attributes included in the user preference information, and the top-ranked locations can be selected based on the ranking. In another example, two or more identified locations may be presented to the user, and the user may be given the opportunity to select one or more of the locations.

Figure 2C:
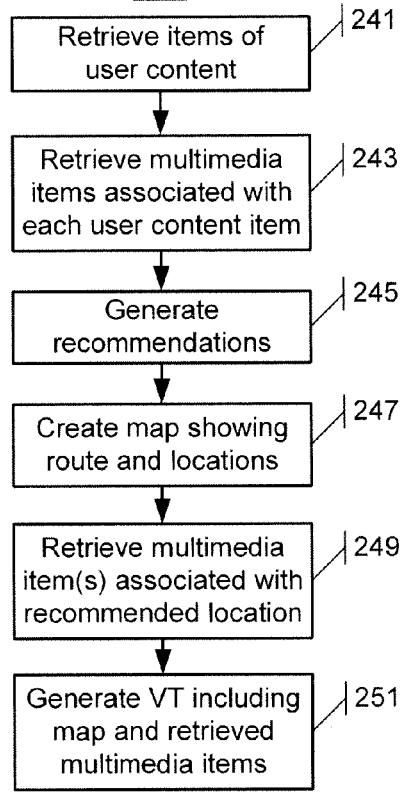
FIG. 2C is a flow diagram showing steps involved in a method for generating a virtual trip using a set of items of user content.

FIG. 2C is a flow diagram showing steps involved in a method 240 for generating a virtual trip (VT) using a set of items of user content. In the system 100 of FIG. 1, the method 240 may be performed at least in part by the virtual trip engine 109 of application server 101.

Method 240 begins at step 241 with items in a set of user content being retrieved from a user content database 113. All items in a set may be identified by searching for all items stored in the database and having a same set identifier, for example. In step 243, the one or more multimedia items associated with each retrieved item are retrieved from the user content database 113 for inclusion in the VT. The retrieved multimedia items may be image, audio, or video files, or other items suitable for inclusion in a slideshow, movie, or other presentation to a user.

Based on the retrieved items of user content, recommendations may be generated in step 245. The recommendations may be generated, for example, by causing the recommendation engine 107 to perform a method such as methods 200 and/or 220. In general, the recommendation may identify recommended locations, retrieved from a database of such locations, that are located near a route linking the retrieved items of user content. In some examples, however, the recommendation may select, from among identified recommended locations, those locations that are most likely to be of interest to a user (i.e., preferred locations). The preferred locations may be identified based on user preference data, such as user preference data for the user associated with the set of items retrieved in step 241, user preference data for a user identified as a sharing target, or the like. Step 245 may thus conclude with one or more recommended or preferred locations being identified, and with receipt of information for a revised route linking the locations of the items of user content with the recommended or preferred locations.

In step 247, a map is created showing the route linking the locations indicated by the metadata of each of the retrieved items of user content, or the revised route linking the indicated locations of the retrieved items of user content and the locations of the recommended or preferred locations. The map may include a map background, showing roadways, buildings, topography, satellite images, and/or other features of an area depicted in the map. The map may further include a trace showing the route or revised route, as well as tags or other markers indicating the locations of indicated, recommended, or preferred locations. The map may be displayed on any desired screen, such as that of a mobile device for example.

In step 249, the multimedia items associated with each recommended or preferred location are retrieved from the recommended locations database 115 for inclusion in the VT. The retrieved multimedia items may be image, audio, or video files (e.g., photographs of the recommended locations, advertisements for the recommended locations, or the like), or other items suitable for inclusion in a presentation to a user.

Finally, in step 251, the VT is automatically generated based on the map created in step 247, and on the multimedia items retrieved in steps 243 and 249. The VT is automatically generated as a multimedia presentation (e.g., a slideshow or movie), in which the retrieved image and video multimedia content is displayed for viewing by a user on a terminal device 105 or other display screen. The VT can further include audio components, which may be presented for a user to listen to on a speaker at the same time as related images and/or video are displayed. The VT additionally can intersperse, among the image and video content, presentation of the map or portions of the map generated in step 247. The VT may further include background music, visual transitions between presented items (e.g., fade in or fade out of images, visual animations, or the like). In general, the retrieved content is included in the VT in the time-order (i.e., in the order determined in step 203 of method 200) or in the route order (i.e., in the order determined in step 209 of method 200). The VT, once automatically generated, thus provides a multimedia presentation including the items of user content and the recommended or preferred locations.

Figure 2D:
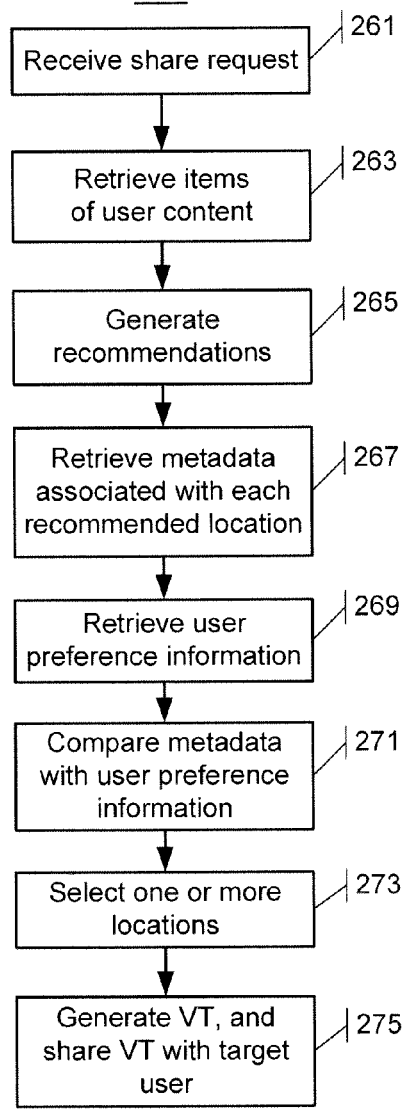
FIG. 2D is a flow diagram showing steps involved in a method for sharing a set of user items with another user.

FIG. 2D is a flow diagram showing steps involved in a method 260 for sharing a set of user items with another user. In the system 100 of FIG. 1, the method 260 may be performed by the sharing engine 111 of application server 101.

The method 260 begins at step 261, in which a share request is received by the sharing engine 111. The share request identifies a set of user items (e.g., by including an identifier for a set of user items stored in user content database 113), and a target user with whom the set should be shared. In general, the target user is a different user from the user associated with the identified set of user items. However, in some examples, the target user may be the same user associated with the identified set of user items. The target user may be identified by the user associated with the identified set of user items (e.g., in the case of a user wanting to share photos with a friend). Alternatively, the target user may identify himself/herself by requesting a VT related to a selected set of user items. On a different example, the target user can be automatically identified by a computer program, such as a computer program configured to identify target users who may have an interest in a particular set of items of user content.

In steps 263 and 265, functions similar to those described in relation to step 241 and 245 are performed. In particular, items of user content of the set of user content identified in step 261 are retrieved, and a set of recommended locations is determined based on the locations of retrieved items of user content.

In step 267, the metadata associated with each recommended location is retrieved from the database of recommended locations 115, and in step 269, user preference information for the target user identified in step 261 is obtained. In step 271, the metadata for the recommended locations is compared with the user preference information, similarly to step 227 of method 220, and one or more of the recommended locations are selected as preferred locations in step 273 based on the results of the comparison. Finally, in step 275, a virtual trip that is customized to the target user is created and shared with the target user, for example by sending the VT or a link to the VT to an address of the target user. The generation of the VT in step 275 may involve steps similar to steps 243, 249, and 251 of method 240. The generated VT may include multimedia items associated with the items in the set identified in step 261, multimedia items associated with recommended locations selected based on the target user's preference information, and a map showing a route linking locations associated with the displayed multimedia items.

FIGS. 3A-3C are block diagrams illustratively showing data structures used in the system 100 and in the methods 200, 220, 240, and 260 for providing services relating to virtual trips. FIG. 3A shows a data structure 300 for storing user content information in a user content database 113; FIG. 3B shows a data structure 330 for storing recommended location information in a recommended locations database 115; and FIG. 3C shows a data structure 360 for storing user preference information in an application data database 117.

Data structure 300 of FIG. 3A stores information on user content items. Each row in the data structure 300 corresponds to a different user item. Each row includes an identifier SetID for the set of user items that the row is associated with, such that all rows associated with a same set of user items have the same SetID, and all items associated with a particular set can be retrieved by identifying all rows having the SetID of the particular set. In addition to the SetID, each row includes an identifier for the multimedia content associated with the user item, such as a file name and/or storage path for the multimedia item. Each row further includes metadata including a geographical identifier (e.g., GPS coordinates) and a timestamp indicating the location and time of origin of the item of user content. Optionally, an identifier UserID of a user that a content item is associated with can be included in the row.

Data structure 330 of FIG. 3B stores information on recommended locations. Each row in the data structure 330 corresponds to a different recommended location. Each row includes a unique identifier ItemID for the recommended location, and an identifier for one or more multimedia content(s) associated with the recommended location, such as a file name and/or storage path for the multimedia item. Each row further includes metadata including a geographical identifier (e.g., GPS coordinates, street address, or the like) indicating the location of the recommended location, and including a name for the recommended location. Each row further includes a list of attributes indicative of characteristics of the recommended locations, such as characteristics which may be used to determine whether a particular user may have an interest in the recommended location. For example, the attributes can include information about the type of location (e.g., national park, tourist site, restaurant, store or commerce, or the like), the type of transportation available for accessing the location (e.g., car only, car, bike, foot, transit, or the like), and any interest categories of the location (e.g., hiking, Italian food, an elevated price category $$$, or the like). The data structure 330 thus contains information that may be used to geographically locate the recommended location, determine whether any attributes thereof match interests or preferences of a user, and provide one or more multimedia content items related to or representative of the recommended location.

Data structure 360 of FIG. 3C stores information on user preference or profile data. Each row in the data structure 360 corresponds to a different user. Each row includes a unique identifier UserID for a user, and a list of SetIDs of sets of items of user content that are associated with the user. In addition, each row includes metadata indicative of the user's preferences. For example, the metadata can include information on preferred trip length, locations previously visited, and information on the user's interests which may be used to identify recommended locations which may appeal to the user. In one example, the user preference data is provided by a user for storage in the data structure 360, for example by providing the user with an opportunity to input user preference data or to answer prompts relating to user preferences. In the example, the user preference data is additionally generated based on items of user content in the user content database 113 which are associated with the user. The user preference data can be generated by matching the location of an item of user content in database 300 with the location of a recommended location identified in database 330, determining based on the match that the user has visited the recommended location and that a user's preference may match the attributes for the location identified in data structure 330, and adding as the user's interests in the data structure 360 the attributes of the identified recommended location. Alternatively, only those recurrent attributes of recommended locations that are matched to visited locations (i.e., attributes associated with two or more recommended locations that are matched to visited locations) may be added as the user's interests.

Figure 4A:
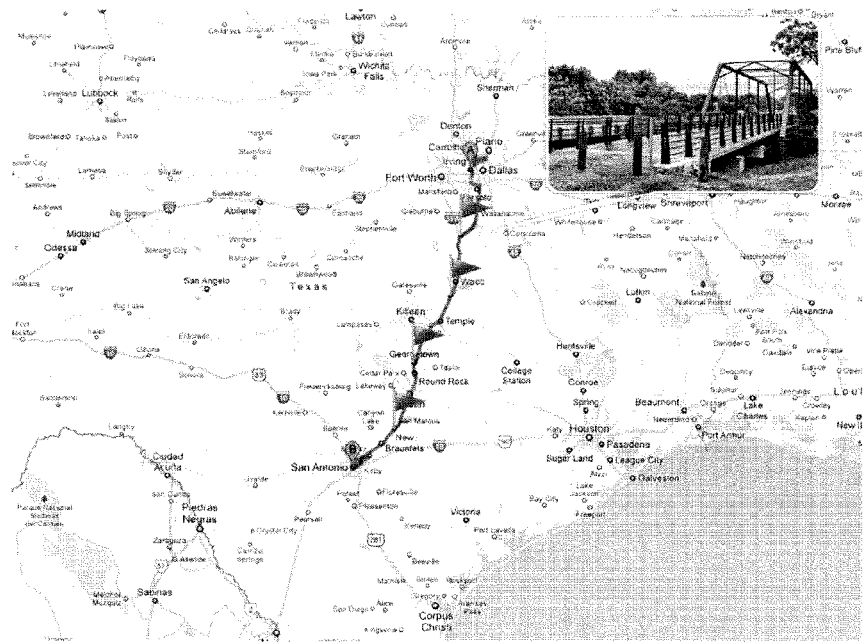
FIGS. 4A and 4B show illustrative displays that may form part of a virtual trip display or presentation.
Figure 4B:
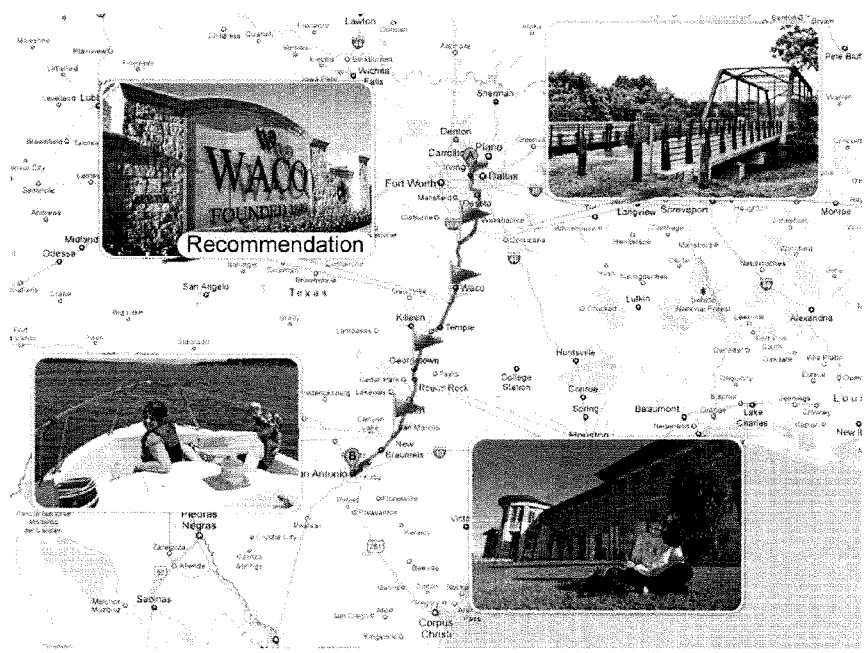

FIGS. 4A and 4B show illustrative displays 400 and 450 that may form part of a virtual trip (VT) display or presentation. The displays 400 and 450 may corresponds to one slide within a VT slideshow, or the displays may correspond to a frame of a VT movie. Both displays 400 and 450 show a map as a background. The map includes a route starting at a point "A" and ending at a point "B", and passing through a plurality of intermediate locations indicated by flags. Each flag corresponds to the location indicated in an item of user content, or the location associated with a recommended location that is part of the VT. During presentation of the VT, one or more multimedia items may be presented to the user. For example, display 400 shows one multimedia item corresponding to an image of a bridge shown as part of the display, while display 450 shows multiple multimedia items shown at the same time. In the display 450, one of the multimedia items is labeled as a "recommendation" to indicate that the item corresponds to a recommended location and not to an item of user content. While displays 400 and 450 show multiple multimedia items shown in a picture-in-picture format, the displays can alternatively successively show each multimedia item and/or map in full screen mode.

While the foregoing description has focused on situations in which each item of user content has associated metadata including a geographical identifier, in some examples one or more items of user content may not have associated geographical identifiers. In such examples, the multimedia item associated with the item of user content can be retrieved, and an image, audio, or video search can be performed to attempt to locate an image, audio, or video that matches the multimedia item. The search may look for matches among multimedia items associated with recommended locations in the recommended location database 115, or among images, audio, or video retrieved from the Internet. If the search results in a match, the location information associated with the matching item can be used as location information for item of user content.

As described in the above discussion, functions relating to virtual trips may be implemented on computers and/or servers connected for data communication, as shown in FIG. 1. Although special purpose devices may be used, such devices also may be implemented using one or more hardware platforms intended to represent a general class of data processing device commonly used to run "server" programming so as to implement the application server, recommendation engine, virtual trip engine, and sharing engine functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the user content, recommended locations, and application data databases. The software code is executable by the general-purpose computer that functions as the application server and/or that functions as a terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for providing services relating to virtual trips, in essentially the manner performed in the implementations discussed and illustrated herein.

Figure 5:
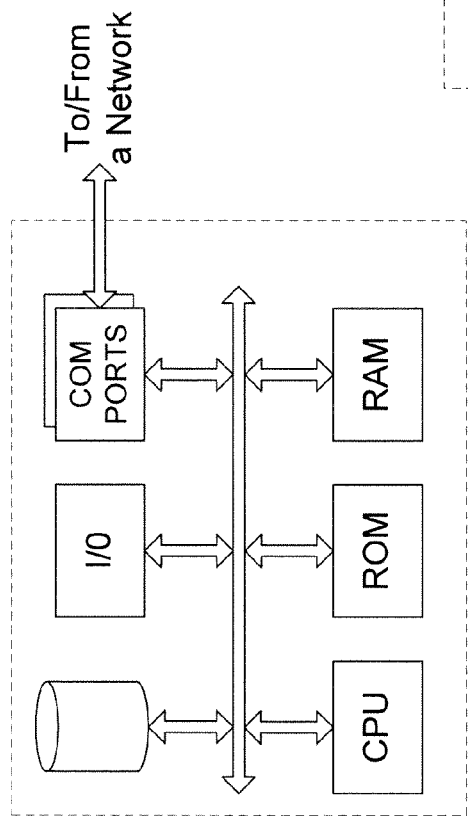
FIGS. 5 and 6 are simplified functional block diagrams of computers or other work stations or terminal devices that may be configured as hosts/servers or terminal devices, for example, to function as the application server or terminal device in the system of FIG. 1.
Figure 6:
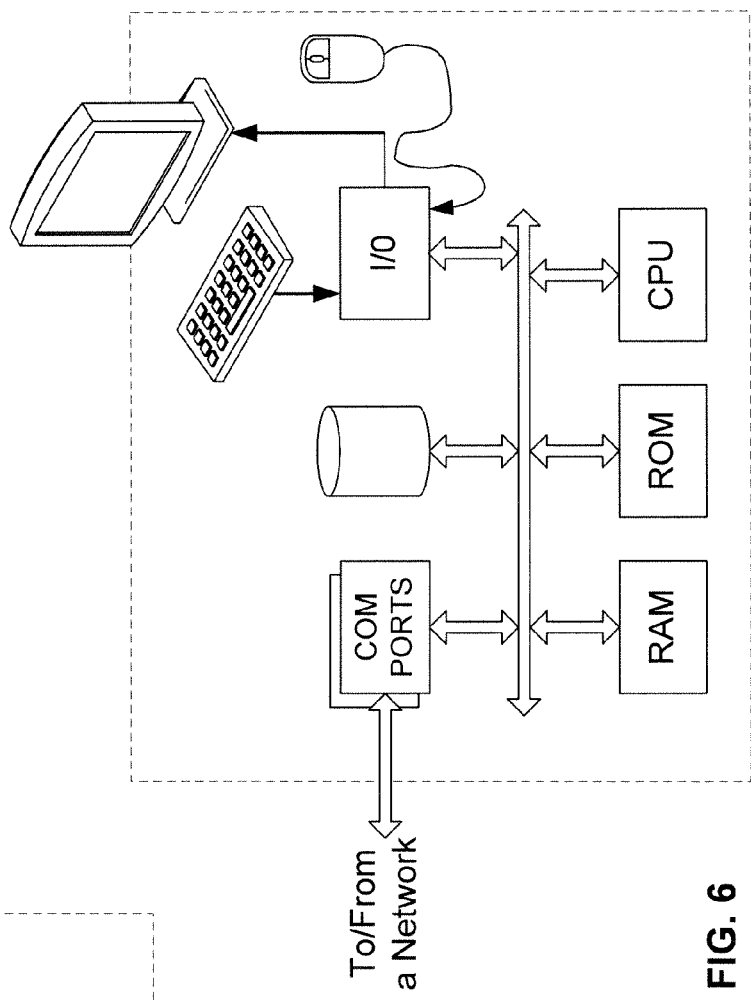

FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems, and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of providing services relating to virtual trips outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of the computer that will be the application server. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising steps of:
receiving a set of items of user content, wherein each respective item of user content in the set includes at least one multimedia item and associated metadata including a geographical identifier and a time-stamp indicating location and time of origin of the respective item of user content;
ordering the items of user content in the set in time-order, based on the time-stamp included in the metadata for the items of user content;
determining a route linking, in time-order, the locations indicated by the geographical identifiers included in the metadata for the items of user content;
from a database of recommended locations each having an associated geographical identifier, selecting a location that is located near the determined route and is not geographically coincident with any of the locations indicated by the geographical identifiers of the items of user content; and
sending information for a map containing an illustration of the route and an illustration of the selected location as a recommendation to a terminal device for presentation to a user.

2. The method of claim 1, wherein the step of selecting the location comprises:
from the database of recommended locations, identifying a plurality of locations that are located near the determined route and are not geographically coincident with any of the locations indicated by the geographical identifiers of the items of user content;
retrieving, from the database of recommended locations, metadata associated with each location of the identified plurality of locations;
retrieving, from a user profile, metadata indicative of a user preference; and
selecting a location from among the identified plurality of locations based on a comparison of the metadata associated with each location of the identified plurality of locations with the metadata indicative of the user preference.

3. The method of claim 2, wherein:
the set of items of user content is associated with a first user;
the retrieved metadata is indicative of a user preference of a second user with which the first user has shared the set of items of user content; and
the information for the map and the illustration of the selected location is sent to a terminal device for presentation to the second user.

4. The method of claim 1, further comprising a step of:
determining a revised route linking the selected location and the time-ordered locations for the items of user content, by:

determining where, within the sequence of time-ordered locations for the items of user content, the selected location should be included, such that the revised route is the shortest route linking the locations for the items of user content in time order and passing through the selected location.

5. The method of claim 4, wherein the sending of information for a map comprises sending information containing an illustration of the revised route and an illustration of the selected location as a recommendation to a terminal device for presentation to a user.

6. The method of claim 1, further comprising steps of:
retrieving the multimedia items included with each item of user content in the set;
generating a map including the illustration of the route; and
generating a multimedia presentation including the retrieved multimedia items, the illustration of the selected location, and the generated map.

7. The method of claim 1, wherein the step of selecting a location comprises selecting, from the database of recommended locations, a location that is located less than a first distance away from the determined route and is located more than a second distance away from any of the locations indicated by the geographical identifiers of the items of user content.

8. The method of claim 1, wherein the step of determining the route comprises determining a route following known roadways or paths and linking the locations indicated by the geographical identifiers included in the metadata for the items of user content.

9. A system comprising:
a first database for storing user content, including sets of items of user content wherein each respective item of user content in a set includes at least one multimedia item and associated metadata including a geographical identifier and a time-stamp indicating location and time of origin of the respective item of user content;
a second database for storing information on recommended locations, wherein each recommended location has at least one multimedia item and an associated geographical identifier; and
an application server, in communication with the first and second databases, configured to perform functions including function to:
retrieve a set of items of user content from the first database;
order the items of user content in the set in time-order, based on the time-stamp included in the metadata for the items of user content;
determine a route linking, in time-order, the locations indicated by the geographical identifiers included in the metadata for the items of user content;
select, from the second database, a location that is located near the determined route and is not geographically coincident with any of the locations indicated by the geographical identifiers of the items of user content; and
send information for a map containing an illustration of the route and an illustration of the selected location as a recommendation to a terminal device for presentation to a user.

10. The system of claim 9, wherein performing the function to select the location includes performing functions to:
identify, in the second database, a plurality of locations that are located near the determined route and are not geographically coincident with any of the locations indicated by the geographical identifiers of the items of user content;
retrieve, from the second database, metadata associated with each location of the identified plurality of locations;
retrieve, from a user profile, metadata indicative of a user preference; and
select a location from among the identified plurality of locations based on a comparison of the metadata associated with each location of the identified plurality of locations with the metadata indicative of the user preference.

11. The system of claim 10, wherein:
the set of items of user content is associated with a first user;
the retrieved metadata is indicative of a user preference of a second user with which the first user has shared the set of items of user content; and
the information for the map and the illustration of the selected location is sent to a terminal device for presentation to the second user.

12. The system of claim 9, wherein the application server is further configured to perform a function to:
determine a revised route linking the selected location and the time-ordered locations for the items of user content, by:
determining where, within the sequence of time-ordered locations for the items of user content, the selected location should be included, such that the revised route is the shortest route linking the locations for the items of user content in time order and passing through the selected location.

13. The system of claim 12, wherein the function to send information for a map comprises a function to send information containing an illustration of the revised route and the illustration of the selected location as a recommendation to a terminal device for presentation to a user.

14. The system of claim 9, wherein the application server is further configured to perform functions to:
retrieve, from the first database, the multimedia items included with each item of user content in the set;
generate a map including the illustration of the route; and
generate a multimedia presentation including the retrieved multimedia items, the illustration of the selected location, and the generated map.

15. The system of claim 9, wherein the function to select a location comprises a function to select, from the second database, a location that is located less than a first distance away from the determined route and is located more than a second distance away from any of the locations indicated by the geographical identifiers of the items of user content.

16. The system of claim 9, wherein the function to determine the route comprises a function to determine a route following known roadways or paths and linking the locations indicated by the geographical identifiers included in the metadata for the items of user content.

* * * * *